US009659568B2

(12) United States Patent
Lim et al.

(10) Patent No.: US 9,659,568 B2
(45) Date of Patent: May 23, 2017

(54) METHOD AND AN APPARATUS FOR PROCESSING AN AUDIO SIGNAL

(75) Inventors: Jae Hyun Lim, Seoul (KR); Dong Soo Kim, Seoul (KR); Hyun Kook Lee, Seoul (KR); Sung Yong Yoon, Seoul (KR); Hee Suk Pang, Seoul (KR)

(73) Assignee: LG Electronics Inc., Seoul (KR)

( * ) Notice: Subject to any disclaimer, the term of this patent is extended or adjusted under 35 U.S.C. 154(b) by 1019 days.

(21) Appl. No.: 12/811,180

(22) PCT Filed: Dec. 31, 2008

(86) PCT No.: PCT/KR2008/007868
§ 371 (c)(1),
(2), (4) Date: Oct. 4, 2010

(87) PCT Pub. No.: WO2009/084918
PCT Pub. Date: Jul. 9, 2009

(65) Prior Publication Data
US 2011/0015768 A1 Jan. 20, 2011

Related U.S. Application Data

(60) Provisional application No. 61/120,023, filed on Dec. 4, 2008, provisional application No. 61/017,803, filed on Dec. 31, 2007.

(51) Int. Cl.
*G06F 17/00* (2006.01)
*G10L 19/028* (2013.01)
(Continued)

(52) U.S. Cl.
CPC ........ *G10L 19/028* (2013.01); *G10L 19/0204* (2013.01); *G10L 19/035* (2013.01)

(58) Field of Classification Search
CPC ... G10L 19/00; G10L 19/0204; G10L 19/028; G10L 19/035; G10L 19/038; G10L 25/27
(Continued)

(56) References Cited

U.S. PATENT DOCUMENTS 6,766,293 B1 7/2004 Herre et al.
2003/0233234 A1* 12/2003 Truman et al. ............... 704/256
(Continued)

FOREIGN PATENT DOCUMENTS

CN 101048649 A 10/2007
EP 1808648 A1 7/2007
(Continued)

OTHER PUBLICATIONS

Hsu et al., "Audio Patch Method in MPEG-4 HE-AAC Decoder", Audio Engineering Society: Convention Paper 6221 (117$^{th}$ Convention), Oct. 28-31, 2004 pp. 1-11.*
(Continued)

*Primary Examiner* — Paul McCord
*Assistant Examiner* — Alexander Eljaiek
(74) *Attorney, Agent, or Firm* — Birch, Stewart, Kolasch & Birch, LLP

(57) ABSTRACT

A method of decoding an audio signal, and which includes extracting spectral data and a loss signal compensation parameter from an audio signal bitstream; detecting a loss signal based on the spectral data; generating first compensation data corresponding to the loss signal using a random signal based on the loss signal compensation parameter; generating a scale factor by adding a scale factor difference value to a scale factor reference value if the scale factor corresponds to a band quantized to zero, and the scale factor reference value is included in the loss signal compensation parameter; and generating second compensation data by applying the scale factor to the first compensation data.

10 Claims, 13 Drawing Sheets

(51) Int. Cl.
*G10L 19/00* (2013.01)
*G10L 19/02* (2013.01)
*G10L 19/035* (2013.01)

(58) Field of Classification Search
USPC .................................... 700/94; 704/500–501
See application file for complete search history.

(56) References Cited

U.S. PATENT DOCUMENTS

| | | | | |
|---|---|---|---|---|
| 2006/0045291 | A1 | 3/2006 | Smith | |
| 2006/0165184 | A1 | 7/2006 | Purnhagen et al. | |
| 2006/0241940 | A1 | 10/2006 | Ramprashad | |
| 2007/0016427 | A1* | 1/2007 | Thumpudi et al. ........... | 704/500 |
| 2007/0189426 | A1 | 8/2007 | Kim et al. | |
| 2007/0270987 | A1* | 11/2007 | Fujii ..................... | G10L 19/032 700/94 |
| 2007/0274383 | A1 | 11/2007 | Yu et al. | |
| 2008/0126082 | A1* | 5/2008 | Ehara et al. .................. | 704/205 |
| 2009/0006103 | A1* | 1/2009 | Koishida ............... | G10L 19/167 704/500 |

FOREIGN PATENT DOCUMENTS

| | | | |
|---|---|---|---|
| JP | 11-317672 | A | 11/1999 |
| JP | 2003-186499 | A | 7/2003 |
| JP | 2004-10415 | A | 1/2004 |
| JP | 2007-240819 | A | 9/2007 |
| KR | 10-2007-0084002 | A | 8/2007 |
| RU | 2 190 237 | C2 | 9/2002 |
| RU | 2 288 550 | C1 | 11/2006 |

OTHER PUBLICATIONS

Hsu et al., "Audio Patch Method in MPEG-4 HE-AAC Decoder", Audio Engineering Society, Convention Paper 6221, 117th Convention, Oct. 28-31, 2004, pp. 1-11, San Francisco, CA., USA, XP040506970.

* cited by examiner

METHOD AND AN APPARATUS FOR PROCESSING AN AUDIO SIGNAL

This application is the National Phase of PCT/KR2008/007868 filed on Dec. 31, 2008, which claims priority under 35 U.S.C. 119(e) to U.S. Provisional Application Nos. 61/017,803 filed on Dec. 31, 2007 and 61/120,023 filed on Dec. 4, 2008, all of which are hereby expressly incorporated by reference into the present application.

FIELD OF THE INVENTION

The present invention relates to an apparatus for processing an audio signal and method thereof. Although the present invention is suitable for a wide scope of applications, it is particularly suitable for processing a loss signal of the audio signal.

BACKGROUND ART

Generally, masking effect is based on a psychoacoustic theory. Since small-scale signals neighbor to a large-scale signal are blocked by the large-scale signal, the masking effect utilizes the characteristic that a human auditory system is not good at recognizing them. As the masking effect is used, data may be partially lost in encoding an audio signal.

However, it is not enough for a decoder of a related art to compensate for a loss signal attributed to masking and quantization.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a signal lost in the course of masking and quantization can be compensated for using relatively small bit information.

Another object of the present invention is to provide an apparatus for processing an audio signal and method thereof, by which masking can be performed in a manner of appropriately combining various schemes including masking on a frequency domain, masking on a time domain and the like.

A further object of the present invention is to provide an apparatus for processing an audio signal and method thereof, by which a bitrate can be minimized despite that such signals differing in characteristics as a speech signal, an audio signal and the like are processed by proper schemes according to their characteristics.

Accordingly, the present invention provides the following effects or advantages.

First of all, the present invention is able to compensate for a signal lost in the course of masking and quantization by a decoding process, thereby enhancing a sound quality.

Secondly, the present invention needs considerably small bit information to compensate for a loss signal, thereby considerably reducing the number of bits.

Thirdly, the present invention compensates for a loss signal due to masking according to a user-selection despite that a bit reduction due to the masking is maximized by performing the masking schemes including masking on a frequency domain, masking on a time domain and the like, thereby minimizing a sound quality loss.

Fourthly, the present invention decodes a signal having a speech signal characteristic by a speech coding scheme and decodes a signal having an audio signal characteristic by an audio coding scheme, thereby enabling a decoding scheme to be adaptively selected to match each of the signal characteristics.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
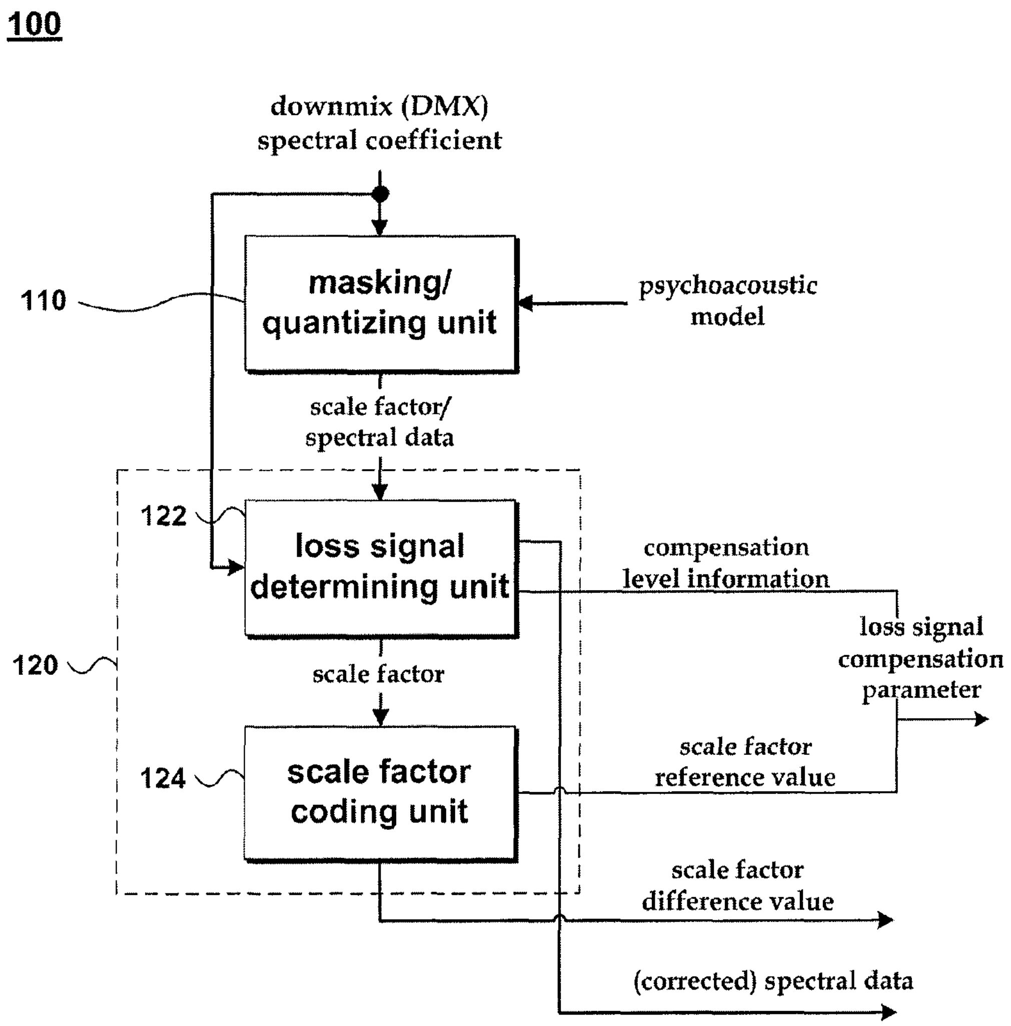
FIG. 1 is a block diagram of a loss signal analyzer according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal includes obtaining spectral data and a loss signal compensation parameter, detecting a loss signal based on the spectral data, generating first compensation data corresponding to the loss signal using a random signal based on the loss signal compensation parameter, and generating a scale factor corresponding to the first compensation data and generating second compensation data by applying the scale factor to the first compensation data.

Preferably, the loss signal corresponds to a signal having the spectral data equal to or smaller than a reference value.

Preferably, the loss signal compensation parameter includes compensation level information and a level of the first compensation data is determined based on the compensation level information.

Preferably, the scale factor is generated using a scale factor reference value and a scale factor difference value and the scale factor reference value is included in the loss signal compensation parameter.

Preferably, the second compensation data corresponds to a spectral coefficient.

To further achieve these and other advantages and in accordance with the purpose of the present invention, an apparatus for processing an audio signal includes a demultiplexer obtaining spectral data and a loss signal compensation parameter, a loss signal detecting unit detecting a loss signal based on the spectral data, a compensation data generating unit generating first compensation data corresponding to the loss signal using a random signal based on the loss signal compensation parameter, and a re-scaling unit generating a scale factor corresponding to the first compensation data, the re-scaling unit generating second compensation data by applying the scale factor to the first compensation data.

To further achieve these and other advantages and in accordance with the purpose of the present invention, a method of processing an audio signal includes generating a scale factor and spectral data in a manner of quantizing a spectral coefficient of an input signal by applying a masking effect based on a masking threshold, determining a loss signal using the spectral coefficient of the input signal, the sale factor and the spectral data, and generating a loss signal compensation parameter to compensate the loss signal.

Preferably, the loss signal compensation parameter includes compensation level information and a scale factor reference value, the compensation level information corresponds to information relevant to a level of the loss signal, and the scale factor reference value corresponds to information relevant to scaling of the loss signal.

To further achieve these and other advantages and in accordance with the purpose of the present invention, an apparatus for processing an audio signal includes a quantizing unit generating a scale factor and spectral data in a manner of quantizing a spectral coefficient of an input signal by applying a masking effect based on a masking threshold and a loss signal predicting unit determining a loss signal using the spectral coefficient of the input signal, the sale factor and the spectral data, the loss signal predicting unit generating a loss signal compensation parameter to compensate the loss signal.

Preferably, the compensation parameter includes compensation level information and a scale factor reference value, the compensation level information corresponds to information relevant to a level of the loss signal, and the scale factor reference value corresponds to information relevant to scaling of the loss signal.

To further achieve these and other advantages and in accordance with the purpose of the present invention, a computer-readable storage medium includes digital audio data stored therein, the digital audio data including spectral data, a scale factor and a loss signal compensation parameter, wherein the loss signal compensation parameter includes compensation level information as information for compensating a loss signal attributed to quantization and wherein the compensation level information corresponds to information relevant to a level of the loss signal.

It is to be understood that both the foregoing general description and the following detailed description are exemplary and explanatory and are intended to provide further explanation of the invention as claimed.

DESCRIPTION OF EMBODIMENTS

Reference will now be made in detail to the preferred embodiments of the present invention, examples of which are illustrated in the accompanying drawings.

First of all, terminologies in the present invention can be construed as the following references. And, terminologies not disclosed in this specification can be construed as the following meanings and concepts matching the technical idea of the present invention. It is understood that 'coding' can be construed as encoding or coding in a specific case. 'Information' in this disclosure is the terminology that generally includes values, parameters, coefficients, elements and the like and its meaning can be construed as different occasionally, by which the present invention is not limited.

In this disclosure, an audio signal is conceptionally discriminated from a video signal in a broad sense and can be interpreted as a signal identified auditorily in reproduction. The audio signal is conceptionally discriminated from a speech signal in a narrow sense and can be interpreted as a signal having none of a speech characteristic or a small speech characteristic.

An audio signal processing method and apparatus according to the present invention can become a lost signal analyzing apparatus and method or a loss signal compensating apparatus and method and can further become an audio signal encoding method and apparatus having the former apparatus and method applied thereto or an audio signal decoding method and apparatus having the former apparatus and method applied thereto. In the following description, a loss signal analyzing/compensating apparatus and method are explained and an audio signal encoding/decoding method performed by an audio signal encoding/decoding apparatus is then explained.

Figure 2:
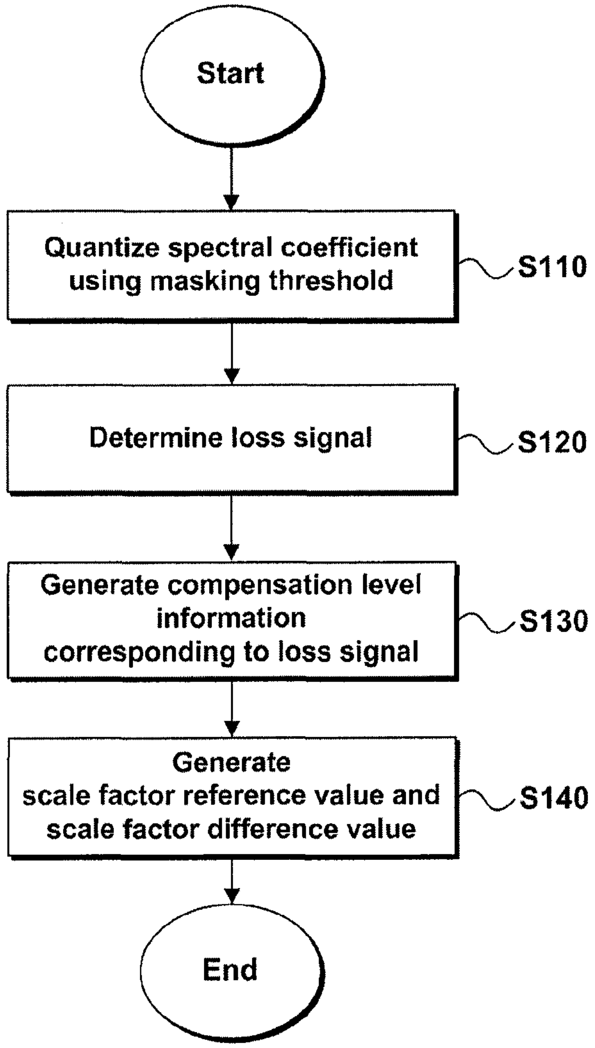
FIG. 2 is a flowchart of a loss signal analyzing method according to an embodiment of the present invention.

FIG. 1 is a block diagram of an audio signal encoding apparatus according to an embodiment of the present invention, and FIG. 2 is a flowchart of an audio signal encoding method according to an embodiment of the present invention.

First, referring to FIG. 1, a loss signal analyzer 100 includes a loss signal predicting unit 120 and is able to further include a masking/quantizing unit 110. In this case, the loss signal predicting unit 120 can include a loss signal determining unit 122 and a scale factor coding unit 124. The following description is made with reference to FIG. 1 and FIG. 2.

First of all, the masking/quantizing unit 110 generates a masking threshold based on spectral data using a psychoacoustic model. The masking/quantizing unit 110 obtains a scale factor and spectral data by quantizing a spectral coefficient corresponding to a downmix (DMX) using the masking threshold [step S110]. In this case, the spectral coefficient may include an MDCT coefficient obtained by MDCT (modified discrete transform), by which the present invention is not limited. The masking threshold is provided to apply the masking effect.

As mentioned in the foregoing description, the masking effect is based on a psychoacoustic theory. Since small-scale signals neighbor to a large-scale signal are blocked by the large-scale signal, the masking effect utilizes the characteristic that a human auditory system is not good at recognizing them.

For instance, a largest signal exists among data corresponding to a frequency band exits in the middle and several signals considerably smaller than the largest signal can exist neighbor to the largest signal. In this case, the largest signal becomes a masker and a masking curve can be drawn with reference to the masker. The small signal blocked by the masking curve becomes a masked signal or a maskee. Hence, if the masked signal is excluded and the rest of the signals are left as valid signals, it is called masking. In this case, loss signals eliminated by the masking effect are set to 0 in principle and can be occasionally reconstructed by a decoder. This will be explained later together with the description of a loss signal compensating method and apparatus according to the present invention.

Meanwhile, various embodiments exist for a masking scheme according to the present invention. Their details shall be explained with reference to FIG. 5 and FIG. 6 later.

In order to apply the masking effect, as mentioned in the foregoing description, the masking threshold is used. A process for using the masking threshold is explained as follows.

First of all, each spectral coefficient can be divided by a scale factor band unit. Energy $E_n$ can be found per the scale factor band. A masking scheme based on the psychoacoustic model theory is applicable to the obtained energy values. A masking curve can be obtained from each masker that is the energy value of the scale factor unit. It is then able to obtain a total masking curve by connecting the respective masking curves. Finally, by referring to the masking curve, it is able to obtain a masking threshold $E_{th}$ that is the base of quantization per scale factor band.

The masking/quantizing unit 110 obtains a scale factor and spectral data from a spectral coefficient by performing masking and quantization using the masking threshold. First of all, the spectral coefficient can be similarly represented using the scale factor and the spectral data, which are integers, as expressed in Formula 1. Thus, the expression with two integer factors is a quantization process.

$$X \cong 2^{\frac{scalefactor}{4}} \times \text{spectral\_data}^{\frac{4}{3}} \quad \text{[Formula 1]}$$

In Formula 1, 'X' is a spectral coefficient, 'scalefactor' is a scale factor, and 'spectral_data' is spectral data.

Referring to Formula 1, it can be observed that the sign of equality is not used. Since each of the scale factor and the spectral data has an integer only, it is unable to entirely express a random X by resolution of the values. Hence, the equality is not established. The right side of Formula 1 can be represented as X' in Formula 2.

$$X' = 2^{\frac{scalefactor}{4}} \times \text{spectral\_data}^{\frac{4}{3}} \quad \text{[Formula 2]}$$

Figure 3:
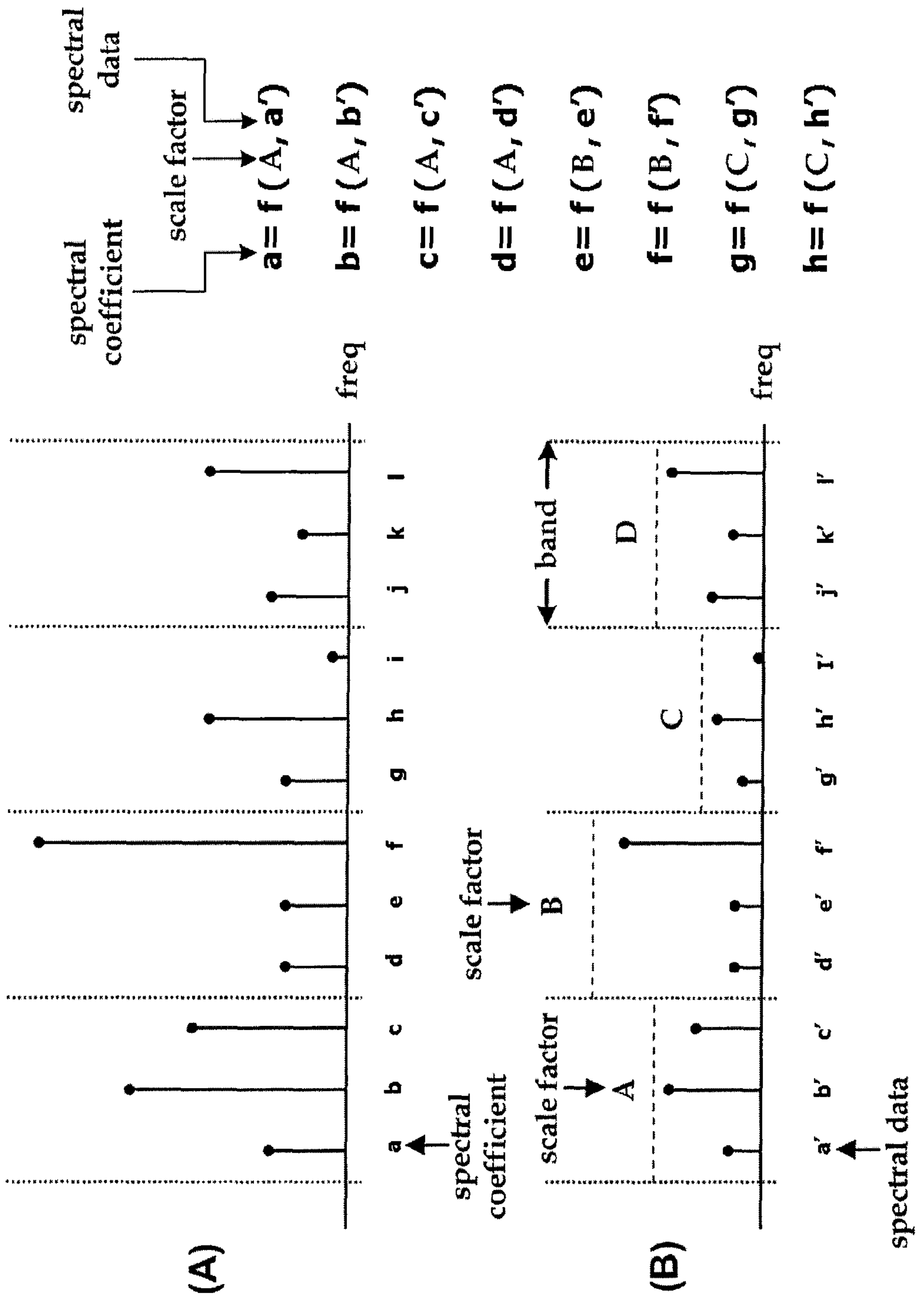
FIG. 3 is a diagram for explaining a scale factor and spectral data.
Figure 4:
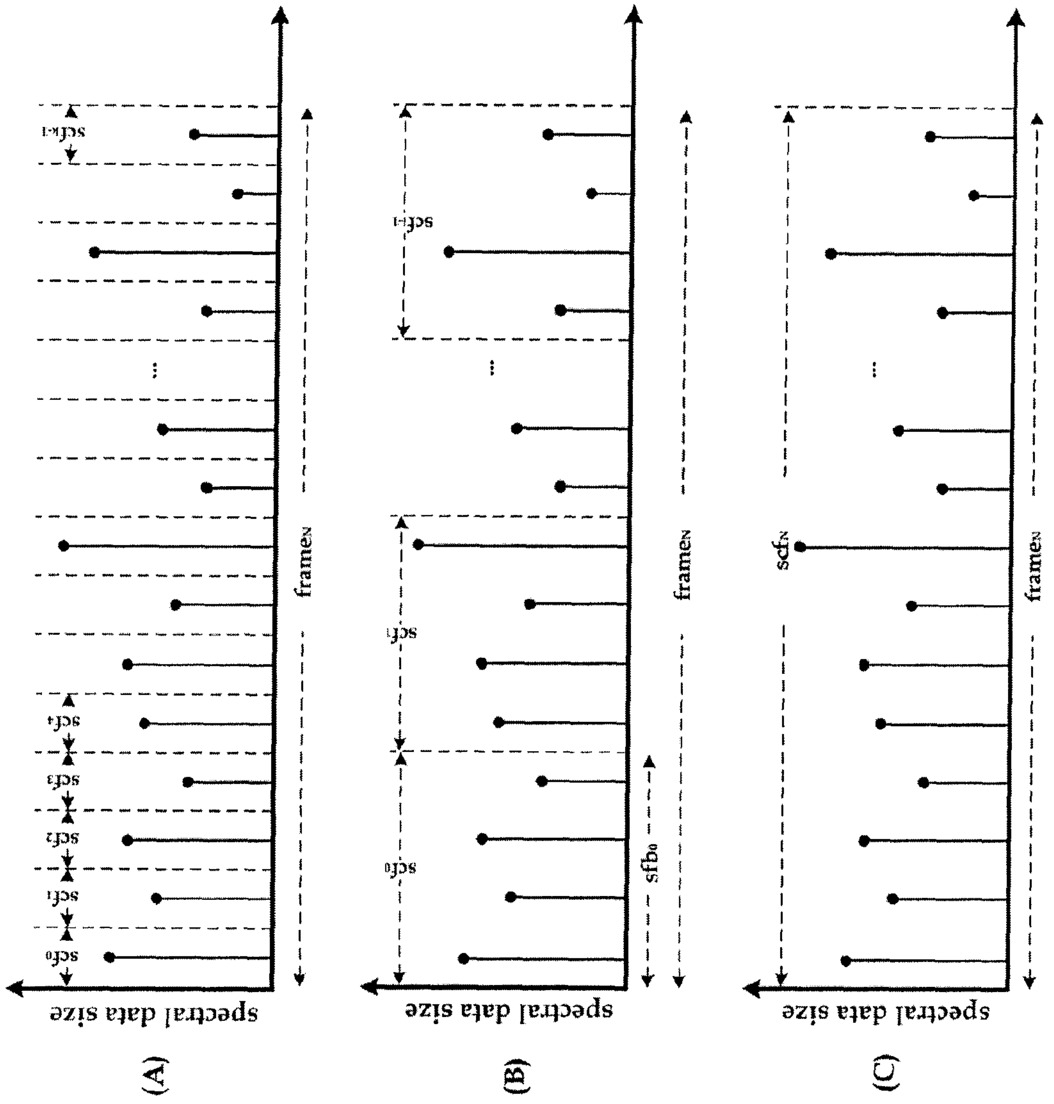
FIG. 4 is a diagram for explaining examples of a scale factor applied range.

FIG. 3 is a diagram for explaining a quantizing process according to an embodiment of the present invention, and FIG. 4 is a diagram for explaining examples of a scale factor applied range.

Referring to FIG. 3, the concept of a process for expressing a spectral coefficient (e.g., a, b, c, etc.) as a scale factor (e.g., A, B, C, etc.) and spectral data (e.g., a', b', c', etc.) is illustrated. The scale factor (e.g., A, B, C, etc.) is a factor applied to a group (e.g., specific band, specific interval, etc.). Thus, it is able to raise a coding efficiency by transforming sizes of coefficients belonging to a prescribed group collectively using a scale factor representing the prescribed group (e.g., scale factor band).

Meanwhile, error may be generated in the course of quantizing a spectral coefficient. And, it is able to regard the corresponding error signal as a difference between an original coefficient X and a value X' according to quantization, which is represented as Formula 3.

$$\text{Error} = X - X' \quad \text{[Formula 3]}$$

In Formula 3, 'X' corresponds to the expression shown in Formula 1 and "X'" corresponds to the expression shown in Formula 2.

Energy corresponding to the error signal (Error) is a quantization error ($E_{error}$).

Using the above-obtained masking threshold ($E_{th}$) and the quantization error ($E_{error}$), scale factor and spectral data are found to meet the condition represented as Formula 4.

$$E_{th} > E_{error} \quad \text{[Formula 4]}$$

In Formula 4, '$E_{th}$' indicates a masking threshold and '$E_{error}$' indicates a quantization error.

Namely, if the above condition is met, the quantization error becomes smaller than the masking threshold. Therefore, it means that energy of noise according to quantization is blocked by the masking effect. So to speak, the noise by the quantization may not be heard by a listener.

Thus, if the scale factor and spectral data are generated to meet the condition and is then transmitted, a decoder is able to generate a signal almost equal to an original audio signal using the scale factor and the spectral data.

Yet, if the above condition is not met because quantization resolution is insufficient for lack of bitrate, sound quality degradation may occur. In particular, if all spectral data existing within a whole scale factor band become 0, the sound quality degradation can be felt considerable. Moreover, even if the above condition according to the psychoacoustic model is met, a specific person may feel the sound quality degradation. Thus, a signal transformed into 0 in an interval, in which spectral data is supposed not to be 0, or the like becomes a signal lost from an original signal.

FIG. 4 shows various examples for a target, to which a scale factor is applied, is shown.

Referring to (A) of FIG. 4, when k spectral data belonging to a specific frame ($frame_N$) exist, it can be observed that a scale factor (scf) is the factor corresponding to one spectral data. Referring to (B) of FIG. 4, it can be observed that a scale factor band (sfb) exists within one frame. And, it can be also observed that a scale factor applied target includes spectral data existing within a specific scale factor. Referring to (C) of FIG. 4, it can be observed that a sale factor applied target includes all spectral data existing within a specific frame. In other words, there can exist various scale factor targets. For example, the scale factor applied target can include one spectral data, several spectral data existing within one scale factor band, several spectral data existing within one frame, or the like.

Therefore, the masking/quantizing unit obtains the scale factor and the spectral data by applying the masking effect in the above-described manner.

Referring now to FIG. 1 and FIG. 2, the loss signal determining unit 122 of the loss signal predicting unit 120 determines a loss signal by analyzing an original downmix (spectral coefficient) and a quantized audio signal (scale factor and spectral data) [step S120].

In particular, a spectral coefficient is reconstructed using a scale factor and spectral data. An error signal (Error), as represented in Formula 3, is then obtained from finding a difference between the reconstructed coefficient and an original spectral coefficient. On the condition of Formula 4, a scale factor and spectral data are determined. Namely, a corrected scale factor and corrected spectral data are outputted. Occasionally (e.g., if a bitrate is low), the condition of Formula 4 may not be met.

After confirming the scale factor and the spectral data, a corresponding loss signal is determined. In this case, the loss signal may be the signal that becomes equal to or smaller than a reference value according to the condition. Alternatively, the loss signal can be the signal that is randomly set to a reference value despite deviating from the condition. In this case, the reference value may be 0, by which the present invention is not limited.

Having determined the loss signal in the above manner, the loss signal determining unit 122 generates compensation level information corresponding to the loss signal. In this case, the compensation level information is the information corresponding to a level of the loss signal. In case that a decoder compensates the loss signal using the compensation level information, the compensation can be made into a loss signal having an absolute value smaller than a value corresponding to the compensation level information.

The scale factor coding unit 124 receives the scale factor and then generates a scale factor reference value and a scale factor difference value for the scale factor corresponding to a specific region [step S140]. In this case, the specific region can include the region corresponding to a portion of a region where a loss signal exists. For instance, all information belonging to a specific band can correspond to a region corresponding to a loss signal, by which the present invention is not limited.

Meanwhile, the scale factor reference value can be a value determined per frame. And, the scale factor difference value is a value resulting from subtracting a scale factor reference value from a scale factor and can be a value determined per target to which the scale factor is applied (e.g., frame, scale factor band, sample, etc.), by which the present invention is not limited.

The compensation level information generated in the step S130 and the scale factor reference value generated in the step S140 are transferred as loss signal compensation parameters to the decoder and the scale factor difference value and the spectral data are transferred as original scheme to the decoder.

The process for predicting the loss signal has been explained so far. In the following description, as mentioned in the foregoing description, a masking scheme according to an embodiment of the present invention is explained in detail with reference to FIG. 5 and FIG. 6.

Various Embodiments for Masking Scheme

Figure 5:
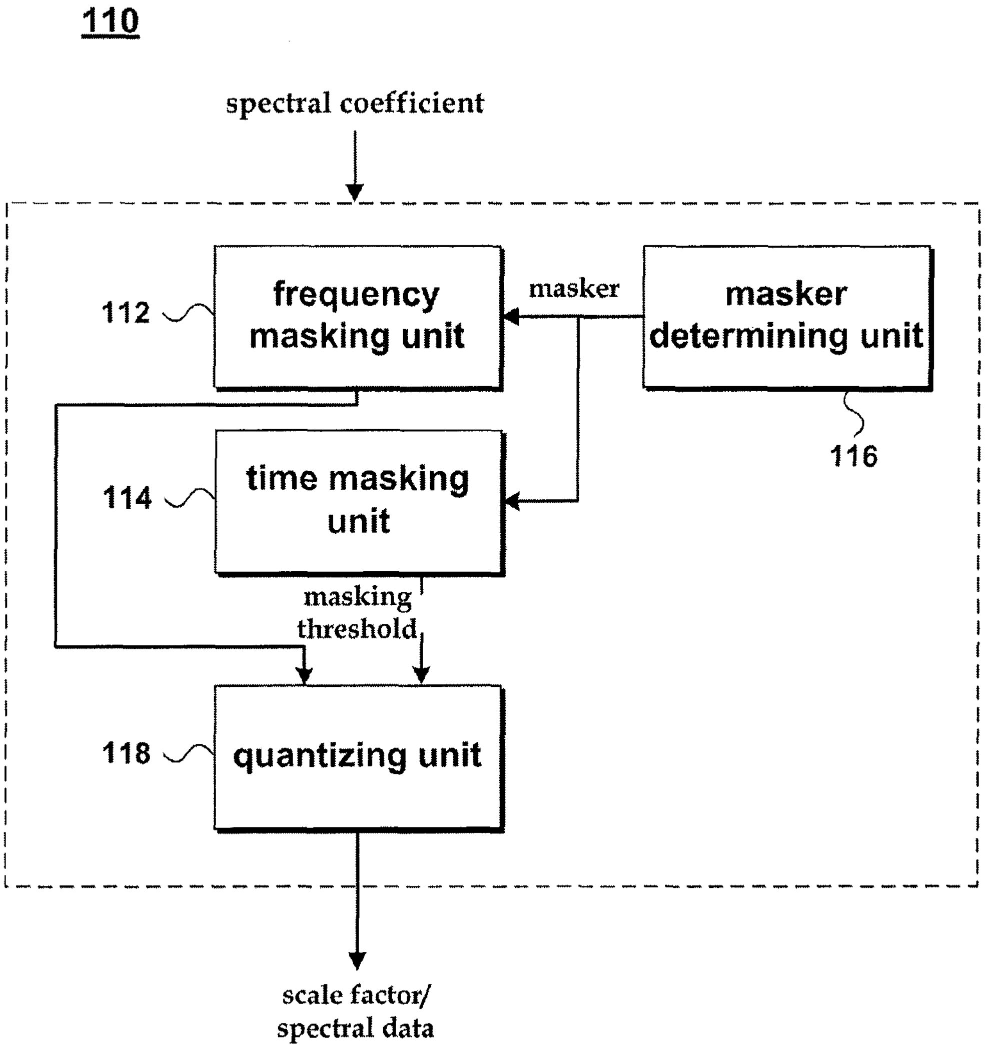
FIG. 5 is a detailed block diagram of a masking/quantizing unit shown in FIG. 1.

Referring to FIG. 5, the masking/quantizing unit 110 can include a frequency masking unit 112, a time masking unit 114, a masker determining unit 116 and a quantizing unit 118.

The frequency masking unit 112 calculates a masking threshold by processing masking on a frequency domain. The time masking unit 114 calculates a masking threshold by processing masking on a time domain. The masker determining unit 116 plays a role in determining a masker on the frequency or time domain. And, the quantizing unit 118 quantizes a spectral coefficient using the masking threshold calculated by the frequency masking unit 112 or the time masking unit 114.

Figure 6:
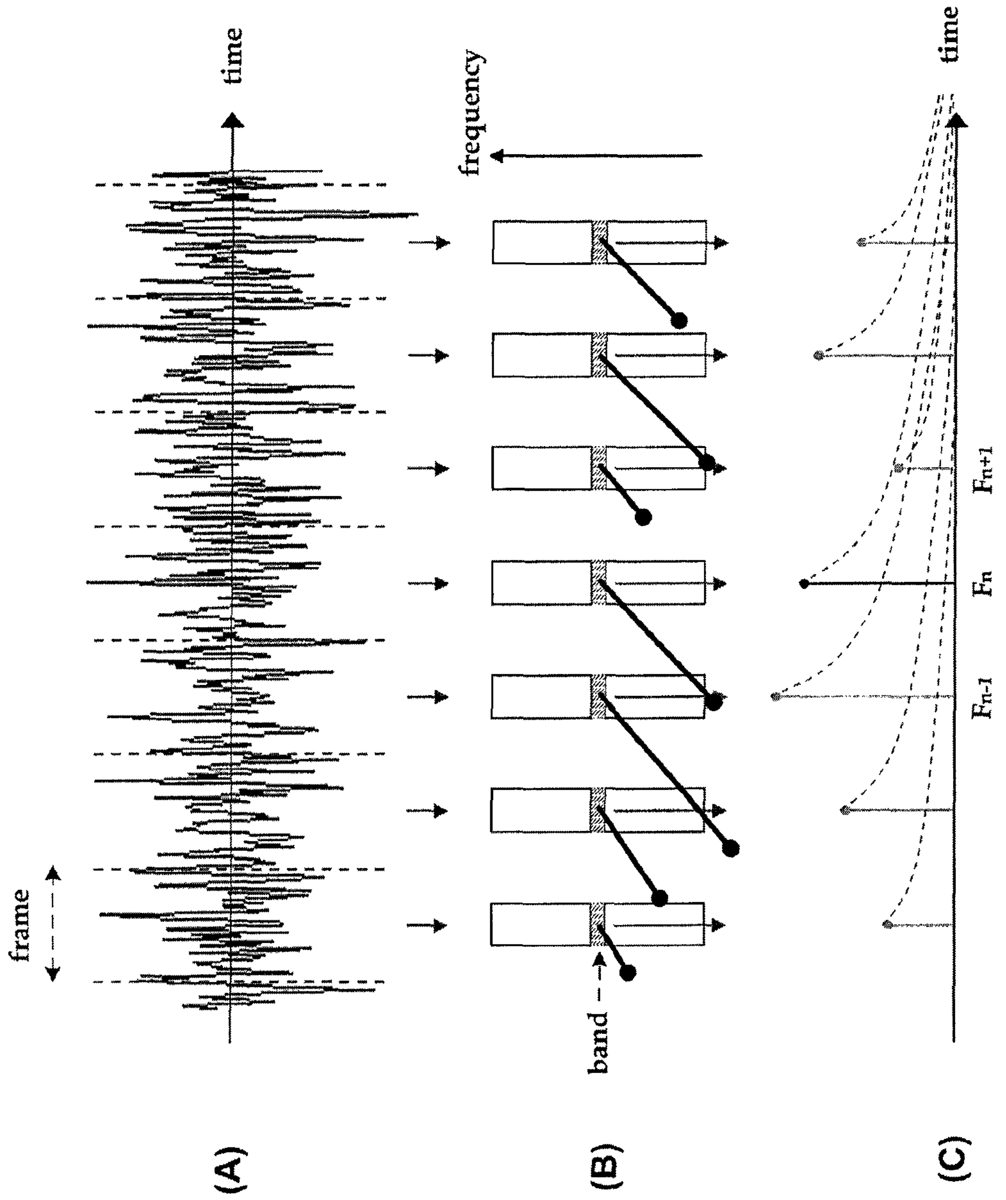
FIG. 6 is a diagram for explaining a masking process according to an embodiment of the present invention.

Referring to (A) of FIG. 6, it can be observed that an audio signal of time domain exists. The audio signal is processed by a frame unit of grouping a specific number of samples. And, a result from performing frequency transform on data of each frame is shown in (B) of FIG. 6.

Referring to (B) of FIG. 6, data corresponding to one frame is represented as one bar and a vertical axis is a frequency axis. Within one frame, data corresponding to each band may be the result from completing a masking processing on a frequency domain by a band unit. In particular, the masking processing on the frequency domain can be performed by the frequency masking unit 112 shown in FIG. 5.

Meanwhile, in this case, the band may include a critical band. And, the critical band means a unit of intervals for independently receiving a stimulus for all frequency area in a human auditory organ. As a specific masker exists within a random critical band, a masking processing can be performed within the band. This masking processing does not affect a signal within a neighbor critical band.

In (C) of FIG. 6, a size of data corresponding to a specific band among data existing per band is represented as a vertical axis to facilitate the data size to be viewed.

Referring to (C) of FIG. 6, a horizontal axis is a time axis and a data size is indicated per frame ($F_{n-1}$, $F_n$, $F_{n+1}$) in a vertical axis direction. This per-frame data independently plays a role as a masker. With reference to this masker, a masking curve can be drawn. And, with reference to this masking curve, a masking processing can be performed in a temporal direction. In this case, a masking on time domain can be performed by the time masking unit 114 shown in FIG. 5.

In the following description, various schemes for each of the elements shown in FIG. 5 to perform a corresponding function will be explained.

1. Masking Processing Direction

In (C) of FIG. 6, a right direction is shown only with reference to a masker. Yet, the time masking unit 114 is able to perform a temporally backward masking processing as well as a temporally forward masking processing. If a large signal exists in an adjacent future on a time axis, a small signal among current signals, which are slightly and temporally ahead of the large signal, may not affect a human auditory organ. In particular, before the small signal is recognized yet, it can be buried in the large signal in the adjacent future. Of course, a time range for generating the masking effect in a backward direction may be shorter than that in a forward direction.

2. Masker Calculation Reference

The masker determining unit 116 can determine a largest signal as a masker in determining a masker. And, the masker determining unit 116 is able to determine a size of a masker based on signals belonging to a corresponding critical band as well. For instance, by finding an average value across whole signals of a critical band, finding an average of absolute value or finding an average of energy, a size of a masker can be determined. Alternatively, another representative value can be used as a masker.

3. Masking Processing Unit

In performing the masking on a frequency transformed result, the frequency masking unit 112 is able to vary a masking processing unit. In particular, a plurality of signals, which are consecutive on time, can be generated within the same frame as a result of the frequency transform. For instance, in case of such frequency transform as wavelet packet transform (WPT), frequency varying modulated lapped transform (FV-MLT) and the like, a plurality of signals consecutive on time can be generated from the same frequency region within one frame. In case of this frequency transform, signals having existed by the frame unit shown in FIG. 6 exist by a smaller unit and the masking processing is performed among signals of the small unit.

4. Conditions for Performing Masking Processing

In determining a masker, the masker determining unit 116 is able to set a threshold of the masker or is able to determine a masking curve type.

If frequency transform is performed, values of signals tend to gradually decrease toward a high frequency in general. Theses small signals can become zero in a quantizing process without performing a masking processing. As the sizes of the signals are small, a size of a masker is small as well. Therefore, the masking effect may become meaningless because there is no effect for the masker to eliminate the signals.

Thus, since there is the case that the masking processing becomes meaningless, it is able to perform the masking processing by setting up a threshold of a masker only if the masker is equal to or greater than a suitable size. This threshold may be equal for all frequency ranges. Using the characteristic that a signal size gradually decreases toward a high frequency, this threshold can be set to decrease in size toward the high frequency.

Moreover, a shape of the masking curve can be explained to have a slow or fast inclination according to a frequency.

Besides, since the masking effect becomes more significant in a part where a signal size is uneven, i.e., where a transient signal exists, it is able to set a threshold of a masker based on the characteristic about whether it is transient or stationary. And, based on this characteristic, it is able to determine a type of a curve of a masker as well.

5. Order of Masking Processing

As mentioned in the foregoing description, the masking processing can be classified into the processing on the frequency domain by the frequency masking unit 112 and the processing on the time domain by the time masking unit 114. In case of using both of the processings simultaneously, they can be handled in the following order:

i) The masking on frequency domain is first handled and the masking on time domain is then applied;

ii) Masking is first applied to signals arranged in time order through frequency transform and masking is then handled on frequency axis;

iii) A frequency-axis masking theory and a time-axis masking theory are simultaneously applied to a signal obtained from frequency transform and masking is then applied using a value obtained from a curve obtained from the two methods; or iv) The above three methods are combined to use.

In the following description, a first example of an audio signal encoding apparatus and method, to which the loss signal analyzer according to the embodiment of the present invention described with reference to FIG. 1 and FIG. 2 are applied, will be explained with reference to FIG. 7.

Figure 7:
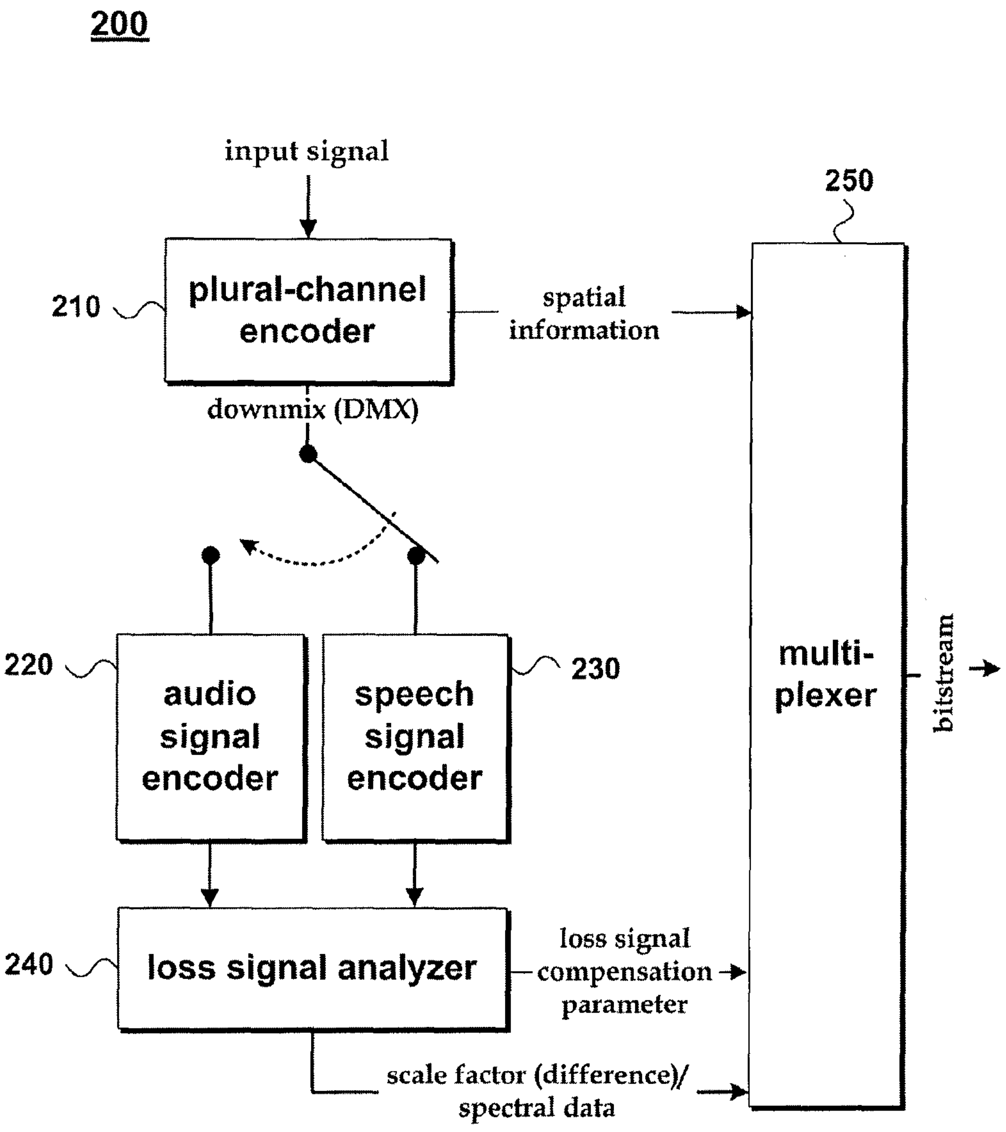
FIG. 7 is a diagram for a first example of an audio signal encoding apparatus having a loss signal analyzer applied thereto according to an embodiment of the present invention.

Referring to FIG. 7, an audio signal encoding apparatus 200 includes a plural-channel encoder 210, an audio signal encoder 220, a speech signal encoder 230, a loss signal analyzer 240 and a multiplexer 250.

The plural-channel encoder 210 generates a mono or stereo downmix signal by receiving a plurality of channel signals (at least two channel signals, hereinafter named plural-channel signal) and then performing downmixing. And, the plural-channel encoder 210 generates spatial information required for upmixing the downmix signal into a plural-channel signal. In this case, the spatial information can include channel level difference information, inter-channel correlation information, channel prediction coefficient, downmix gain information and the like.

In this case, the downmix signal generated by the plural-channel encoder 210 can include a time-domain signal or information of a frequency domain on which frequency transform is performed. Moreover, the downmix signal can include a spectral coefficient per band, by which the present invention is not limited.

Of course, if the audio signal encoding apparatus 200 receives a mono signal, the plural-channel encoder 210 does not downmix the mono signal but the mono signal bypasses the plural-channel encoder 210.

Meanwhile, the audio signal encoding apparatus 200 can further include a band extension encoder (not shown in the drawing). The band extension encoder (not shown in the drawing) excludes spectral data of a partial band (e.g., high frequency band) of the downmix signal and is able to generate band extension information for reconstructing the excluded data. Therefore, a decoder is able to reconstruct a downmix of a whole band with a downmix of the rest band and the band extension information only.

The audio signal encoder 220 encodes the downmix signal according to an audio coding scheme if the downmix signal has an audio characteristic that a specific frame or segment of the downmix signal is large. In this case, the audio coding scheme may follow AAC (advanced audio coding) standard or HE-AAC (high efficiency advanced audio coding) standard, by which the present invention is not limited. Meanwhile, the audio signal encoder may correspond to a modified discrete transform (MDCT) encoder.

The speech signal encoder 230 encodes the downmix signal according to a speech coding scheme if the downmix signal has a speech characteristic that a specific frame or segment of the downmix signal is large. In this case, the speech coding scheme may follow AMR-WB (adaptive multi-rate wide-band) standard, by which the present invention is not limited.

Meanwhile, the speech signal encoder 230 can further use a linear prediction coding (LPC) scheme. In case that a harmonic signal has high redundancy on a time axis, modeling can be obtained from the linear prediction for predicting a current signal from a past signal. In this case, if the linear prediction coding scheme is adopted, it is able to raise coding efficiency. Meanwhile, the speech signal encoder 230 may correspond to a time-domain encoder as well.

The loss signal analyzer 240 receives spectral data coded according to the audio or speech coding scheme and then performs masking and quantization. The loss signal analyzer 240 generates a loss signal compensation parameter to compensate a signal lost by the masking and quantization. Meanwhile, the loss signal analyzer 240 is able to generate a loss signal compensation parameter for the spectral data coded by the audio signal encoder 220 only. The function and step performed by the loss signal analyzer 240 may be identical to those of the former loss signal analyzer 100 described with reference to FIG. 1 and FIG. 2.

And, the multiplexer 250 generates an audio signal bitstream by multiplexing the spatial information, the loss signal compensation parameter, the scale factor (or the scale factor difference value), the spectral data and the like together.

Figure 8:
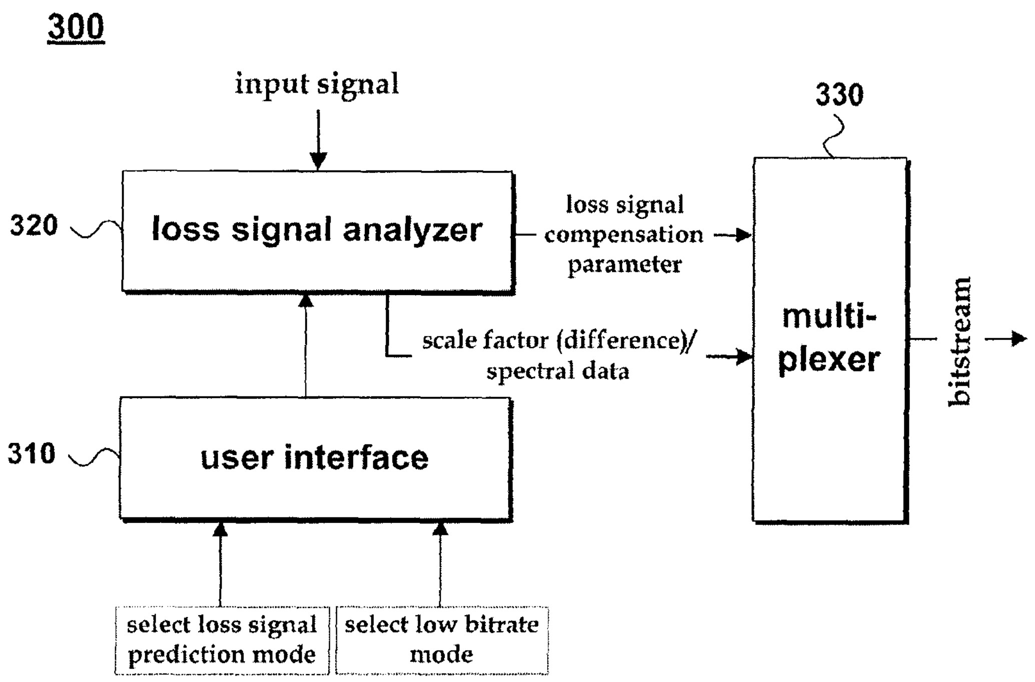
FIG. 8 is a diagram for a second example of an audio signal encoding apparatus having a loss signal analyzer applied thereto according to an embodiment of the present invention.

FIG. 8 is a diagram for a second example of an audio signal encoding apparatus having a loss signal analyzer applied thereto according to an embodiment of the present invention.

Referring to FIG. 8, an audio signal encoding apparatus 300 includes a user interface 310 and a loss signal analyzer 320 and can further include a multiplexer 330.

The user interface 310 receives an input signal from a user and then delivers a command signal for loss signal analysis to the loss signal analyzer 320. In particular, in case that the user selects a loss signal prediction mode, the user interface 310 delivers the command signal for the loss signal analysis to the loss signal analyzer 320. In case that a user selects a low bitrate mode, a portion of an audio signal can be forced to be set to 0 to match a low bitrate. Therefore, the user interface 310 is able to deliver the command signal for the loss signal analysis to the loss signal analyzer 320. Instead, the user interface 310 is able to deliver information on a bitrate to the loss signal analyzer 320 as it is.

The loss signal analyzer 320 can be configured similar to the former loss signal analyzer 100 described with reference to FIG. 1 and FIG. 2. Yet, the loss signal analyzer 320 generates a loss signal compensation parameter only if receiving the command signal for the loss signal analysis from the user interface 310. In case of receiving the information on the bitrate only instead of the command signal for the loss signal analysis, the loss signal analyzer 320 is able to perform a corresponding step by determining whether to generate the loss signal compensation parameter based on the received information on the bitrate.

And, the multiplexer 330 generates a bitstream by multiplexing the quantized spectral data (sale factor included) and the loss signal compensation parameter generated by the loss signal analyzer 320 together.

Figure 9:
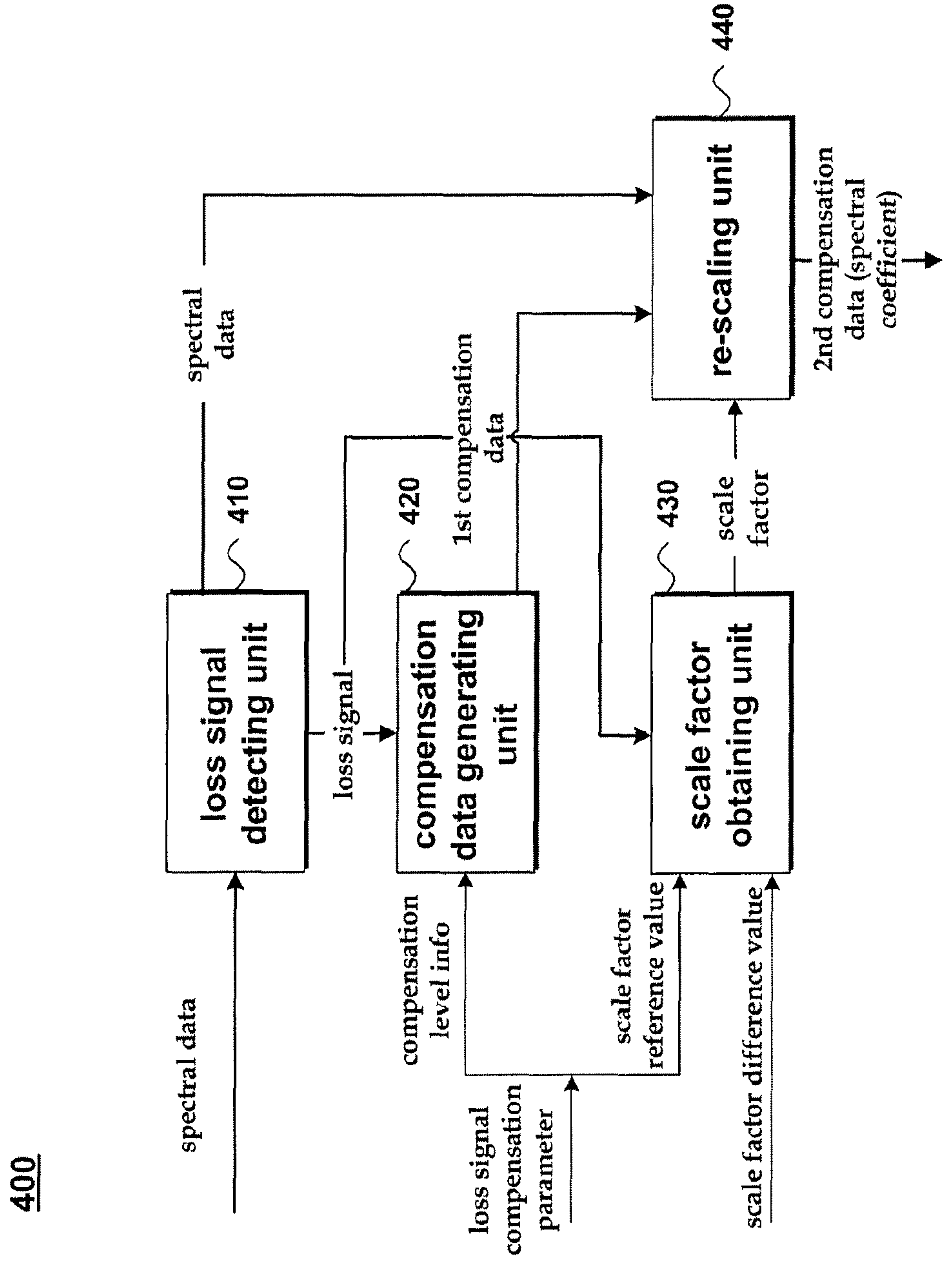
FIG. 9 is a block diagram of a loss signal compensating apparatus according to an embodiment of the present invention.
Figure 10:
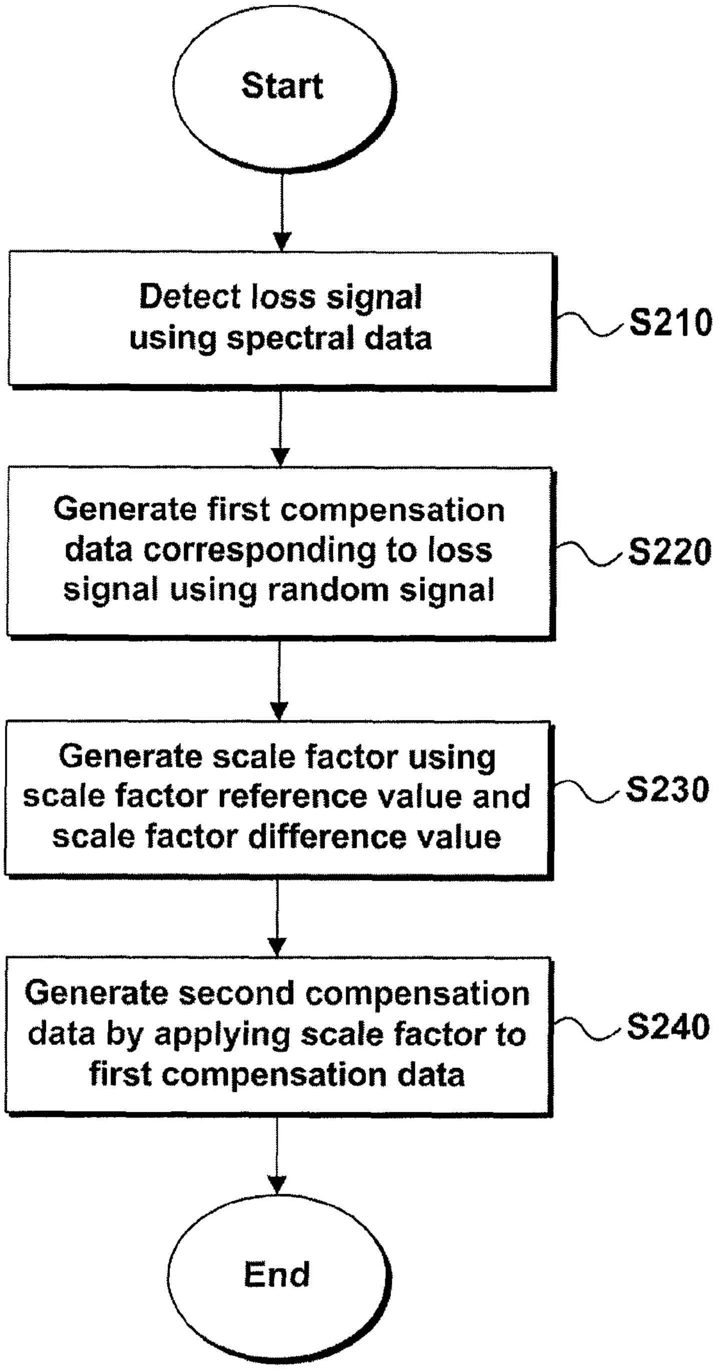
FIG. 10 is a flowchart for a loss signal compensating method according to an embodiment of the present invention.

FIG. 9 is a block diagram of a loss signal compensating apparatus according to an embodiment of the present invention, and FIG. 10 is a flowchart for a loss signal compensating method according to an embodiment of the present invention.

Referring to FIG. 9, a loss signal compensating apparatus 400 according to an embodiment of the present invention includes a loss signal detecting unit 410 and a compensation data generating unit 420 and can further include a scale factor obtaining unit 430 and a re-scaling unit 440. In the following description, a method of compensating an audio signal for a loss in the loss signal compensating apparatus 400 is explained with reference to FIG. 9 and FIG. 10.

First of all, the loss signal detecting unit 410 detects a loss signal based on spectral data. In this case, the loss signal can correspond to a signal having the corresponding spectral data equal to or smaller than a predetermined value (e.g., 0). This signal can have a bin unit corresponding to a sample. As mentioned in the foregoing description, this loss signal is generated because it can be equal to or smaller than a prescribed value in the course of masking and quantization. If the loss signal is generated, in particular, if an interval having a signal set to 0 is generated, sound quality degradation is occasionally generated. Even if the masking effect uses the characteristic of the recognition through the human auditory organ, it is not true that every person is unable to recognize the sound quality degradation attributed to the masking effect. Moreover, if the masking effect is intensively applied to a transient interval having a considerable size variation of signal, the sound quality degradation may occur in part. Therefore, it is able to enhance the sound quality by padding a suitable signal into the loss interval.

The compensation data generating unit 420 uses loss signal compensation level information of the loss signal compensation parameter and then generates a first compensation data corresponding to the loss signal using a random signal [step S220]. In this case, the first compensation data may include a random signal having a size corresponding to the compensation level information.

Figure 11:
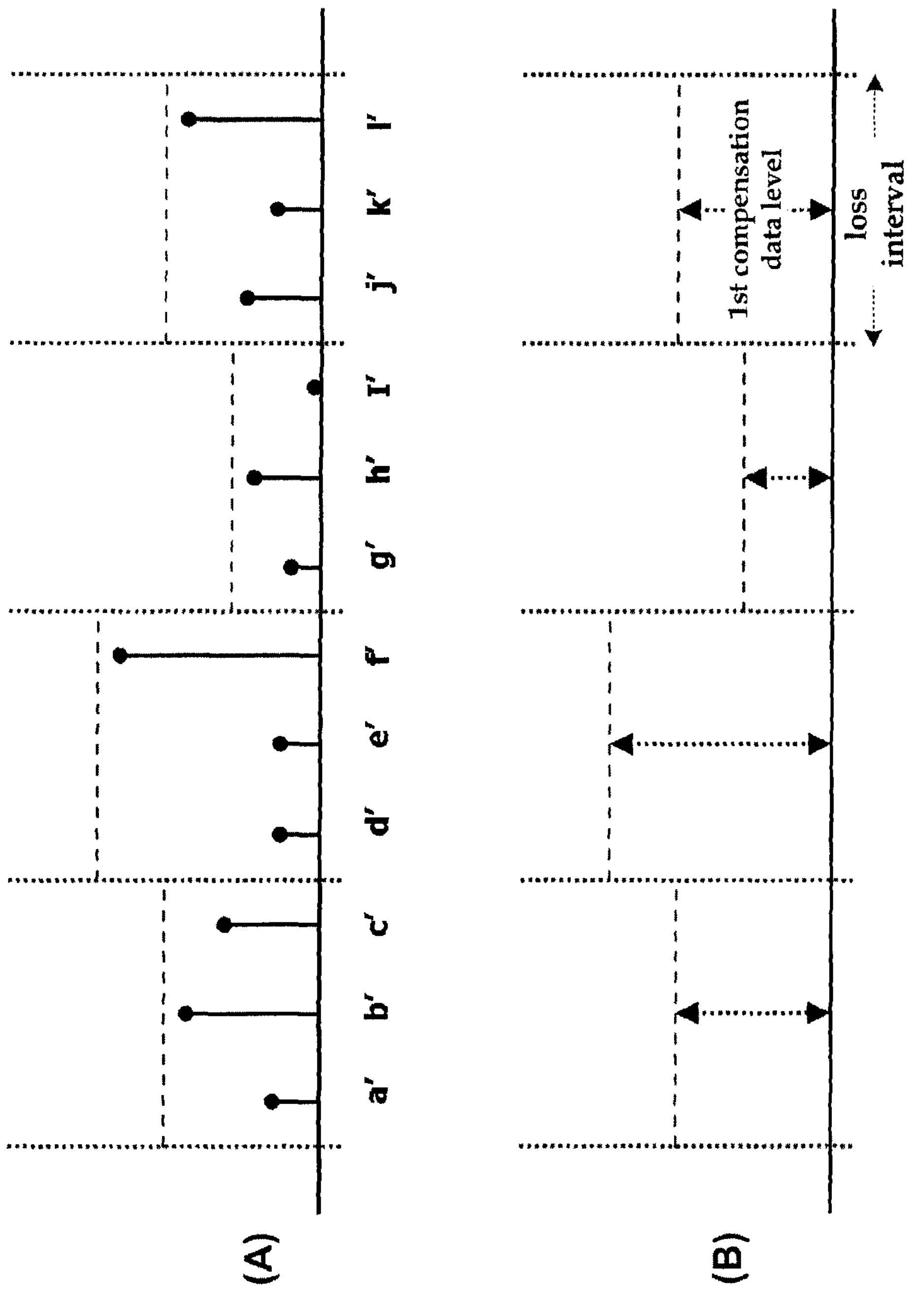
FIG. 11 is a diagram for explaining a first compensation data generating process according to an embodiment of the present invention.

FIG. 11 is a diagram for explaining a first compensation data generating process according to an embodiment of the present invention. In (A) of FIG. 11, per-band spectral data (a', b', c', etc.) of lost signals are shown. In (B) of FIG. 11, a range of level of first compensation data is shown. In particular, the compensation data generating unit 420 is able to generate first compensation data having a level equal to or smaller than a specific value (e.g., 2) corresponding to compensation level information.

The scale factor obtaining unit 430 generates a scale factor using a scale factor reference value and a scale factor difference value [step S230]. In this case, the scale factor is the information for an encoder to scale a spectral coefficient. And, the loss signal reference value can be a value that corresponds to a partial interval of an interval having a loss signal exist therein. For instance, this value can correspond to a band having all samples set to with 0. For the partial interval, a scale factor can be obtained by combining the scale factor reference value with the scale factor difference value (e.g., adding them together). For the rest interval, a transferred scale factor difference value can become a scale factor as it is.

The re-scaling unit 400 generates second compensation data by re-scaling the first compensation data or the transferred spectral data with a scale factor [step S240]. In particular, the re-scaling unit 440 re-scales the first compensation data for the region having the loss signal exist therein. And, the re-scaling unit 440 re-scales the transferred spectral data for the rest region. The second compensation data may correspond to a spectral coefficient generated from the spectral data and the scale factor. This spectral coefficient can be inputted to an audio signal decoder or a speech signal decoder that will be explained later.

Figure 12:
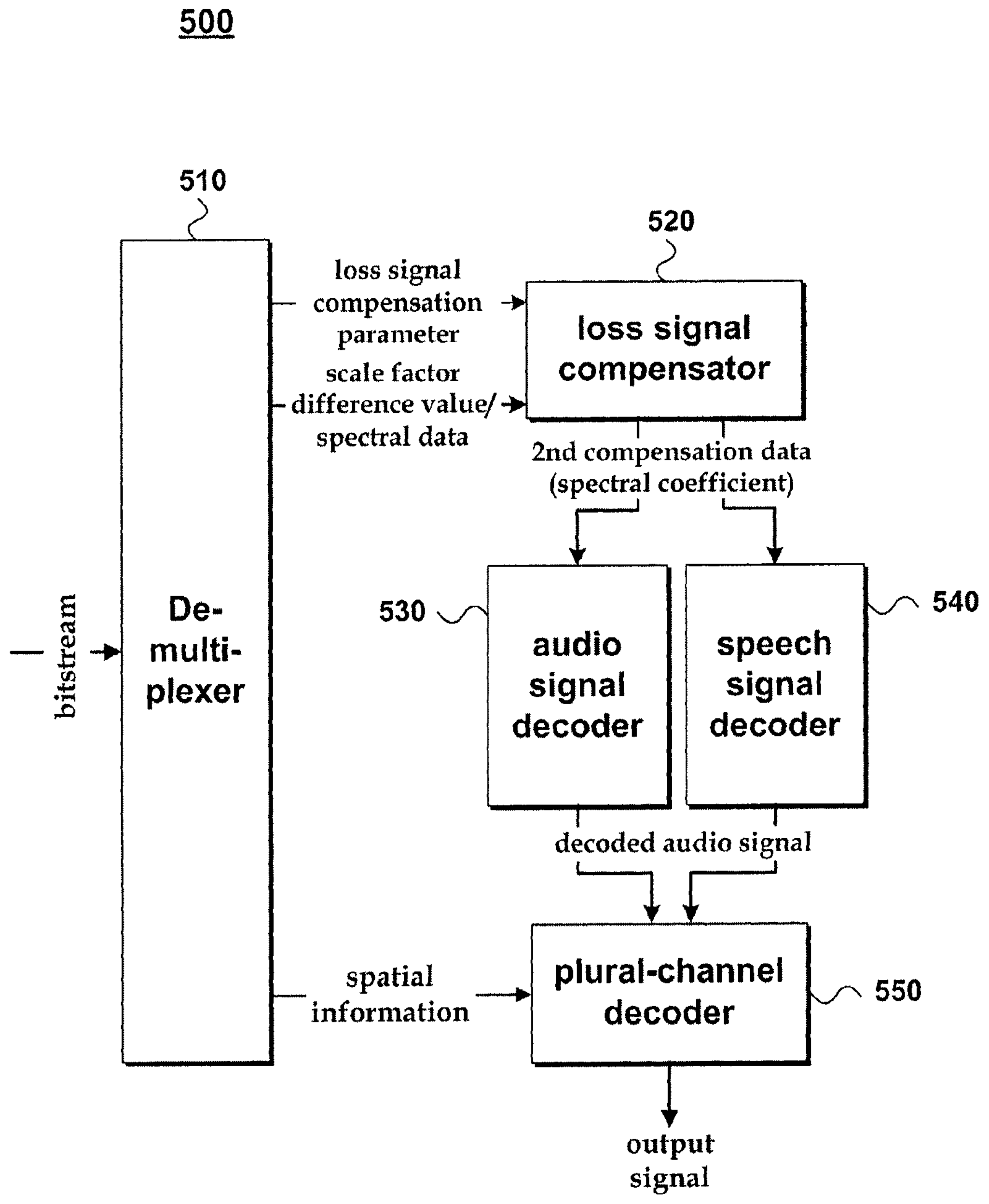
FIG. 12 is a diagram for a first example of an audio signal decoding apparatus having a loss signal compensator applied thereto according to an embodiment of the present invention.

FIG. 12 is a diagram for a first example of an audio signal decoding apparatus having a loss signal compensator applied thereto according to an embodiment of the present invention.

Referring to FIG. 12, an audio signal decoding apparatus 500 includes a demultiplexer 510, a loss signal compensator 520, an audio signal decoder 530, a speech signal decoder 540 and a plural-channel decoder 550.

The demultiplexer 510 extracts spectral data, loss signal compensation parameter, spatial information and the like from an audio signal bitstream.

The loss signal compensator 520 generates first compensation data corresponding to a loss signal using a random signal via the transferred spectral data and the loss signal compensation parameter. And, the loss signal compensator 520 generates second compensation data by applying the scale factor to the first compensation data. The loss signal compensator 520 can be the element playing the almost same role as the former loss signal compensating apparatus 400 described with reference to FIG. 9 and FIG. 10. Meanwhile, the loss signal compensator 520 is able to generate a loss reconstruction signal for the spectral data having the audio characteristic only.

Meanwhile, the audio signal decoding apparatus 500 can further include a band extension decoder (not shown in the drawing). The band extension decoder (not shown in the drawing) generates spectral data of another band (e.g., high frequency band) using the spectral data corresponding to the loss reconstruction signal entirely or in part. In this case, band extension information transferred from the encoder is usable.

If the spectral data (occasionally, spectral data generated by the band extension decoder is included) corresponding to the loss reconstruction signal has a considerable audio characteristic, the audio signal decoder 530 decodes the spectral data according to an audio coding scheme. In this case, as mentioned in the foregoing description, the audio coding scheme may follow the AAC standard or the HE-AAC standard.

If the spectral data has a considerable speech characteristic, the speech signal decoder 540 decodes the spectral data according to a speech coding scheme. In this case, as mentioned in the foregoing description, the speech coding scheme may follow the AMR-WBC standard, by which the present invention is not limited.

If a decoded audio signal (i.e., a decoded loss reconstruction signal) is a downmix, the plural-channel decoder 550 generates an output signal of a plural-channel signal (stereo signal included) using the spatial information.

Figure 13:
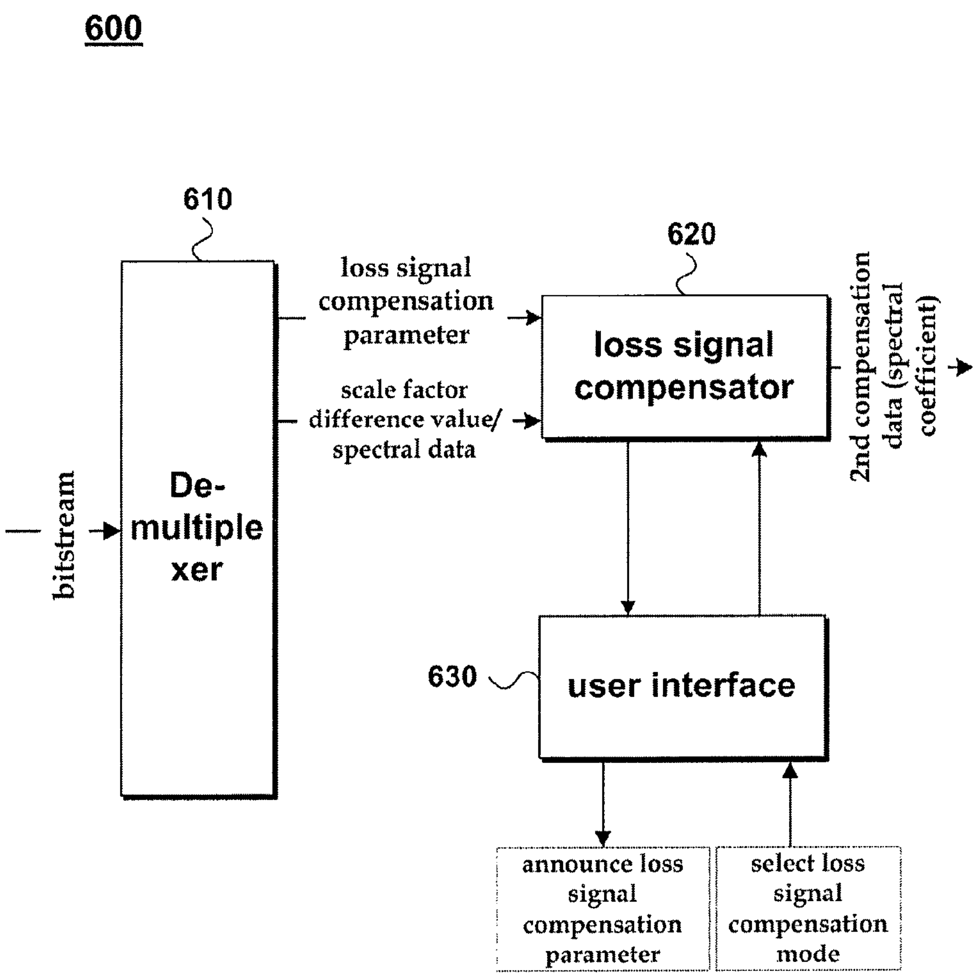
FIG. 13 is a diagram for a second example of an audio signal decoding apparatus having a loss signal compensator applied thereto according to an embodiment of the present invention.

FIG. 13 is a diagram for a second example of an audio signal decoding apparatus having a loss signal compensator applied thereto according to an embodiment of the present invention.

Referring to FIG. 13, an audio signal decoding apparatus 600 includes a demultiplexer 610, a loss signal compensator 620 and a user interface 630.

The demultiplexer 61—receives a bitstream and then extracts a loss signal compensation parameter, quantized spectral data and the like from the received bitstream. Of course, a scale factor (difference value) can be further extracted.

The loss signal compensator 620 can be the element playing the almost same role as the former loss signal compensating apparatus 400 described with reference to FIG. 9 and FIG. 10. Yet, in case that the loss signal compensation parameter is received from the demultiplexer 610, the loss signal compensator 620 informs the user interface 630 of the reception of the loss signal compensation parameter. If a command signal for the loss signal compensation is received from the user interface 630, the loss signal compensator 620 plays a role in compensating the loss signal.

In case that information on a presence of the loss signal compensation parameter is received from the loss signal compensator 620, the user interface 630 displays the reception on a display or the like to enable a user to be aware of the presence of the information.

If a user selects a loss signal compensation mode, the user interface 630 delivers a command signal for the loss signal compensation to the loss signal compensator 620. Thus, the loss signal compensator applied audio signal decoding apparatus includes the above-explained elements and may or may not compensate the loss signal according to a selection made by a user.

According to the present invention, the above-described audio signal processing method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Moreover, a bitstream generated by the encoding method is stored in a computer-readable recording medium or can be transmitted via wire/wireless communication network.

Accordingly, the present invention is applicable to encoding and decoding an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of decoding an audio signal, the method comprising:

extracting spectral data and loss signal compensation information from an audio signal bitstream, wherein the loss signal compensation information indicates whether a current frame performs loss signal compensation using a loss signal compensation parameter, and wherein the loss signal compensation information is extracted from a frequency domain;

when the loss signal compensation information indicates that the current frame performs the loss signal compensation, extracting the loss signal compensation parameter from the audio signal bitstream, wherein the loss signal compensation parameter includes a scale factor reference value and loss signal level information;

determining whether a current band included in the current frame is a band quantized to zero by detecting a loss signal based on the spectral data;

generating a compensation level information using the loss signal level information, wherein the compensation level information indicates an absolute value for replacing the current band when the current band is determined to be the band quantized to zero;

when the current band is determined to be the band quantized to zero, generating first compensation data corresponding to the current band using a random signal and the compensation level information, and generating a modified scale factor corresponding to the current band by adding a scale factor to the scale factor reference value, wherein the scale factor is information to scale the first compensation data, and wherein the scale factor reference value is information for modifying the scale factor for the current frame;

generating second compensation data by applying the modified scale factor to the first compensation data;

generating a loss reconstruction signal using the second compensation data;

determining whether the loss reconstruction signal is an audio characteristic or a speech characteristic based on whether the loss reconstruction signal is a harmonic signal having high redundancy on a time axis;

when the loss reconstruction signal is the audio characteristic, decoding the loss reconstruction signal based on an audio coding scheme; and when the loss reconstruction signal is the speech characteristic, decoding the loss reconstruction signal based on a speech coding scheme, wherein the current band is a scale factor band.

2. The method of claim 1, wherein the first compensation data has a level that is less than or equal to a specific value corresponding to the compensation level information.

3. The method of claim 1, wherein the second compensation data corresponds to a spectral coefficient.

4. An apparatus for decoding an audio signal, the apparatus comprising:

a demultiplexer configured to extract spectral data and loss signal compensation information from an audio signal bitstream, wherein the loss signal compensation information indicates whether a current frame performs loss signal compensation using a loss signal compensation parameter, wherein the loss signal compensation information is extracted from a frequency domain, wherein, when the loss signal compensation information indicates that the current frame performs the loss signal compensation, the demultiplexer is further configured to extract the loss signal compensation parameter from the audio signal bitstream, and wherein the loss signal compensation parameter includes a scale factor reference value and loss signal level information;

a loss signal detecting unit configured to:

determine whether a current band included in the current frame is a band quantized to zero by detecting a loss signal based on the spectral data, and generate a compensation level information using the loss signal level information, wherein the compensation level information indicates an absolute value for replacing the current band when the current band is determined by the loss signal detecting unit to be the band quantized to zero;

a compensation data generating unit configured to generate first compensation data corresponding to the current band using a random signal and the compensation level information when the current band is determined by the loss signal detecting unit to be the band quantized to zero;

a re-scaling unit configured to generate a modified scale factor corresponding to the current band by adding a scale factor to the scale factor reference value when the current band is determined by the loss signal detecting unit to be the band quantized to zero, wherein the scale factor is information to scale the first compensation data, wherein the scale factor reference value is information for modifying the scale factor for the current frame, and wherein the re-scaling unit is further configured to generate second compensation data by applying the modified scale factor to the first compensation data; and a loss signal compensator configured to generate a loss reconstruction signal using the second compensation data; and an audio decoder configured to:

determine whether the loss reconstruction signal is an audio characteristic or a speech characteristic based on whether the loss reconstruction signal is a harmonic signal having high redundancy on a time axis, when the loss reconstruction signal is the audio characteristic, decode the loss reconstruction signal based on an audio coding scheme, and when the loss reconstruction signal is the speech characteristic, decode the loss reconstruction signal based on a speech coding scheme, wherein the current band is a scale factor band.

5. The apparatus of claim 4, wherein the first compensation data has a level that is less than or equal to a specific value corresponding to the compensation level information.

6. The apparatus of claim 4, wherein the second compensation data corresponds to a spectral coefficient.

7. The method of claim 1, further comprising:

generating the scale factor based on a scale factor difference value if the scale factor does not correspond to a band having all spectral data samples quantized to zero.

8. The apparatus of claim 4, wherein the re-scaling unit generates the scale factor based on a scale factor difference value if the scale factor does not correspond to a band having all spectral data samples quantized to zero.

9. The method of claim 1, further comprising:

generating a spectral data of a high frequency band using the second compensation data, wherein a frequency of the high frequency band is higher than a frequency of the current frame.

10. The apparatus of claim 4, further comprising:

a band extension decoder configured to generate a spectral data of a high frequency band using the second compensation data, wherein a frequency of the high frequency band is higher than a frequency of the current frame.

* * * * *